Figure 1:
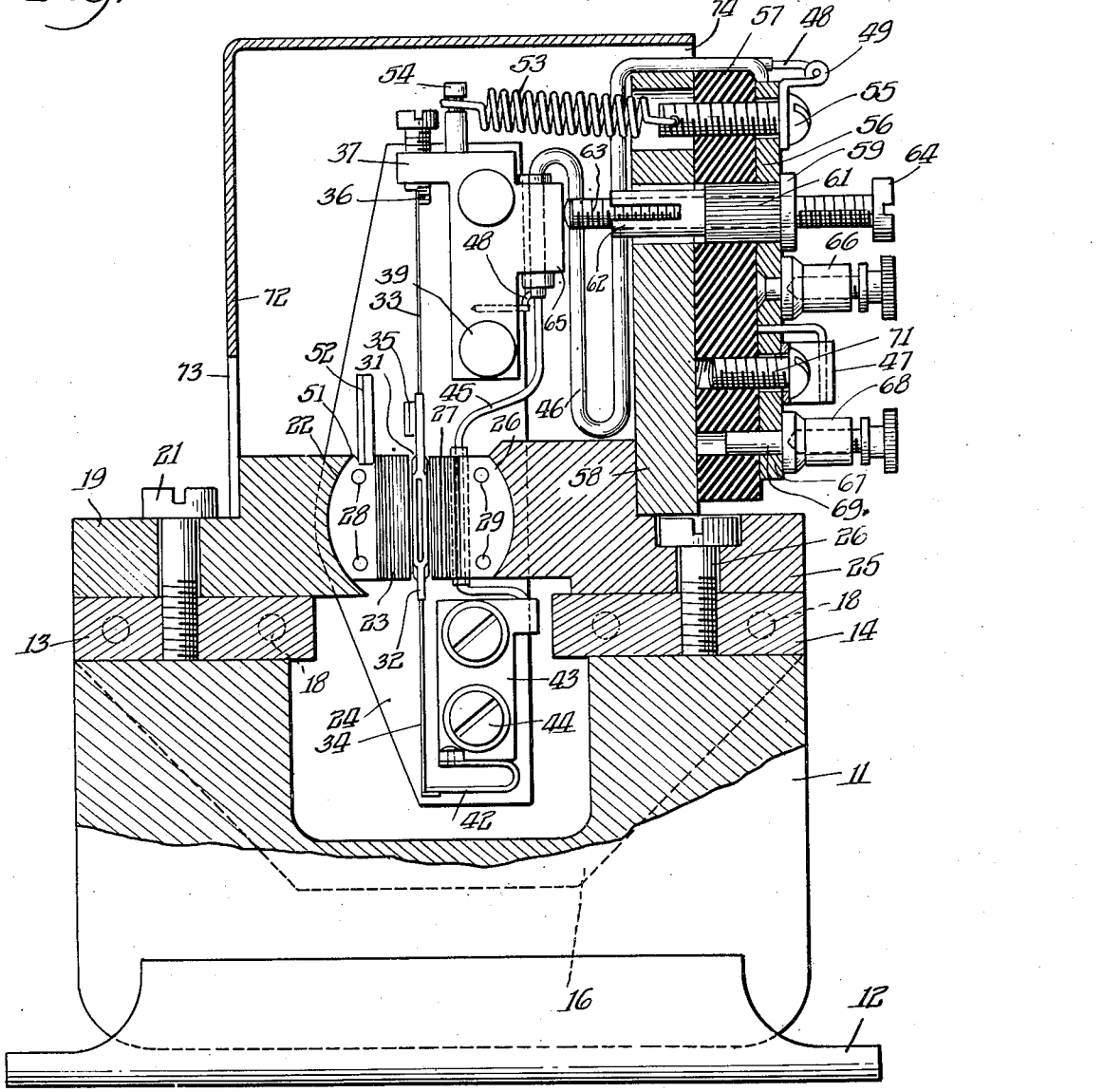

May 3, 1949.    C. M. HATHAWAY    2,469,265
OSCILLOGRAPH

Filed Feb. 24, 1944    2 Sheets-Sheet 1

INVENTOR.
Claude M. Hathaway
BY
Loftus, Moore, Olson & Trexler
attys

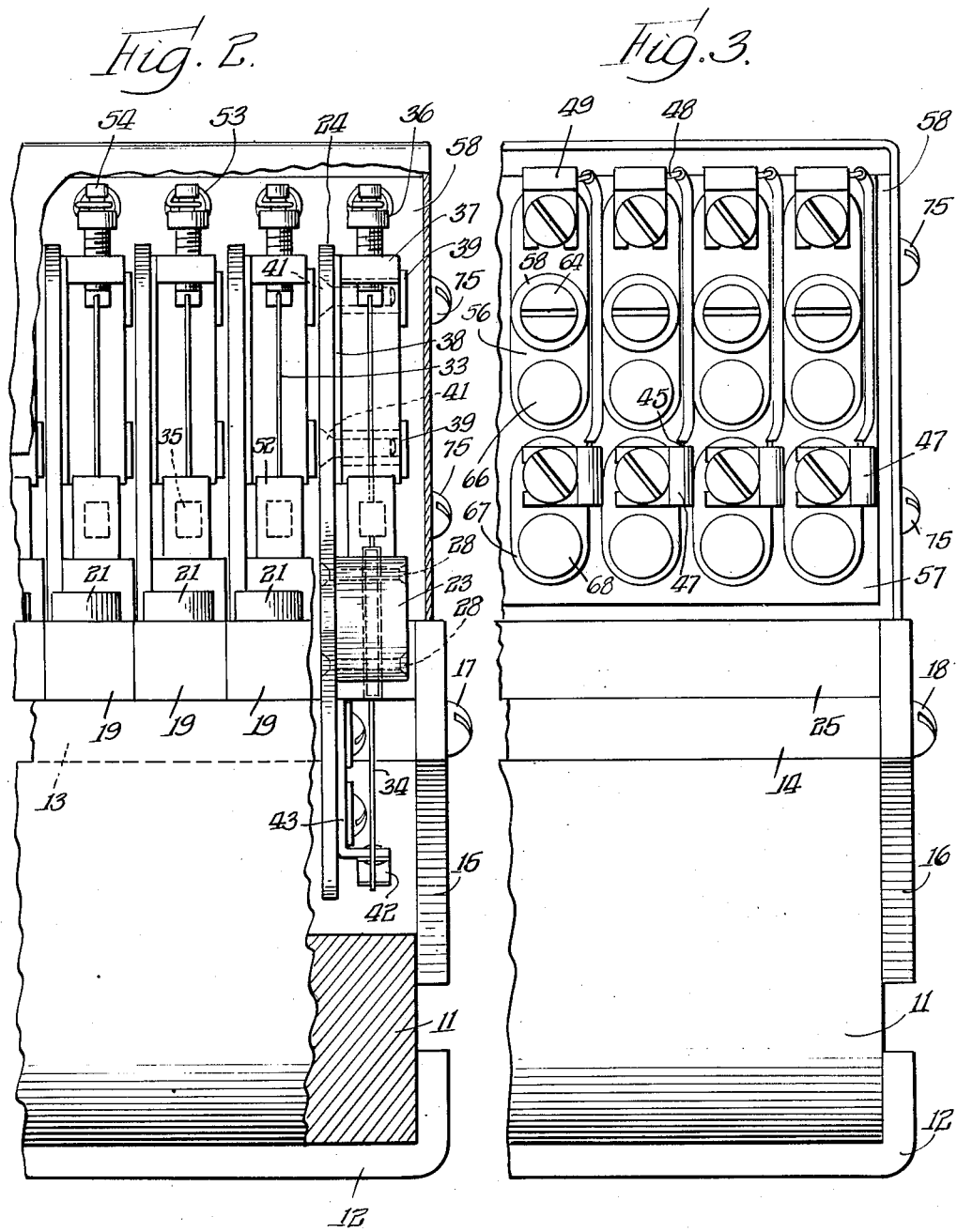

Patented May 3, 1949

2,469,265

UNITED STATES PATENT OFFICE 2,469,265

OSCILLOGRAPH

Claude M. Hathaway, Denver, Colo.

Application February 24, 1944, Serial No. 523,700

1 Claim. (Cl. 171—95)

The present invention relates to oscillographs and more particularly to a moving coil galvanometer for use in oscillographs.

While some progress has been made in reducing the bulk and weight of oscillographs so that a much larger number of galvanometers may be used in an oscillograph to provide a large number of channels, oscillographs generally are not readily portable. Portability is not a prime essential for the use of an oscillograph in a laboratory, but for such applications as aircraft flight testing, geophysical work and other field uses portability becomes a prime essential. In providing portability, however, it is desirable not to make any sacrifices in accuracy, fidelity, record quality, or the number of channels. One factor which greatly determines the size and weight of oscillographs is the galvanometer. Accordingly in order to produce a small size portable oscillograph, it is necessary to provide an improved compact and relatively light weight galvanometer.

In accordance with the present invention an improved small size high quality accurate galvanometer is obtained by utilizing a common permanent magnet field for a plurality of galvanometer elements. By providing a single magnet with a plurality of individual pole pieces cooperating with a particular type of galvanometer element as many as twelve elements may be assembled in a space 4¾ inches long, 3 inches wide, and $4\frac{5}{16}$ inches high. A complete precision oscillograph utilizing such galvanometer assembly provided in a space 18 inches by 9 inches by 8 inches capable of recording on six-inch film or paper in lengths of one hundred feet. Such oscillograph may be provided with a timing system for recording the time at regular intervals on the paper or film. Furthermore a multispeed record drive mechanism may be incorporated and also an automatic record length control device. Other features included are a footage indicator for recording the number of feet of record taken, a record numbering device, a simultaneous viewing screen, a heater for using the oscillograph at low ambient temperatures and various controls commonly provided for oscillographs.

It therefore is an object of the present invention to provide an improved multielement galvanometer assembly for oscillographs.

Still another object of the present invention is to provide an improved multielement galvanometer assembly utilizing a single magnet and having an arrangement which provides for the ready removal of any desired galvanometer element.

Still another object of the present invention is to provide an improved multielement galvanometer assembly utilizing a common magnet and being arranged to provide for the individual vertical adjustment of each galvanometer element.

Other and further objects of the present invention subsequently will become apparent by reference to the following description taken in connection with the accompanying drawing wherein Figure 1 is an end view in partial cross section of a multielement galvanometer assembly incorporating the present invention;

Figure 2 is a partial front view of the apparatus shown in Figure 1, with a portion thereof broken away to illustrate the position of a single galvanometer element relative to the entire assembly; and Figure 3 is a partial rear view of the galvanometer assembly showing the manner in which connections may be made to the individual galvanometer elements.

Referring to the drawing it will be seen that a single U-shaped magnet 11, preferably of the permanent magnet type formed of steel, is provided with a supporting or mounting frame 12 having outwardly extending lugs which may be provided with suitable holes whereby the magnet may be mounted in position with suitable fastening means. Immediately at each end of the legs of the U-shaped magnet portion 11 there are provided soft iron members 13 and 14 for the front and rear legs of the magnet. These soft iron extensions of the pole piece of the magnet 11 preferably are secured to the permanent magnet 11 in any suitable manner as for example by providing end plates 15 and 16 for the magnet 11 and securing the members 13 and 14 thereto by suitable screws or bolts 17 and 18. Each of the soft iron pole extensions 13 and 14 is provided with a plurality of spaced apart threaded openings for receiving the threaded portions of cap screws or stud bolts. The front plate 13 therefore is provided with a plurality of pole piece extensions, 12 in number, such as the pole piece extension 19 which is secured in position by a stud bolt 21. The face of the pole piece 19 is concave so as its surface 22 may cooperate with a complementary convex surface of a pole piece extension 23 carried by a non-magnetic metallic support member or plate 24. The rear pole piece extension plate 14 supports the rear pole piece 25 which is secured in position by a countersunk or recessed stud bolt 20. The rear pole piece 25 is provided with a concave face 26 complementary to a convex face forming a portion of a pole piece extension 27 also mounted on the plate 24. The pole piece extension members 23 and 27 having convex surfaces complementary to the pole extension surfaces 22 and 26 are secured to the support plate 24 by suitable fastening means such as countersunk rivets 28 and 29. Each of the pole pieces 23 and 27 is tapered inwardly toward the air gap 31 as shown in Figure 1 which separates the two pole pieces so that at the air gap a highly concentrated magnetic flux path is provided. Supported within the air gap 31 is a wound coil 32 supported by an upper wire 33 and a lower wire 34. Immediately above the wound coil 32 there is positioned a mirror 35. The upper wire 33 is secured to the end of a threaded adjusting screw 36 mounted in a support bracket 37. The support bracket 37 is insulated from the plate 24 by an insulated plate 38, and is retained in position by cooperating screw members 39 and 41 which may be provided with suitable insulating sleeves and washers so that these members are maintained out of contact with the support plate or bracket 37. The lower wire 34 is connected to a U-shaped spring 42 mounted on a plate 43 which is directly connected to the plate 24 by screw fastening means 44. The plate 43 is connected to an electrical conductor 45 which passes through an insulating cable 46 to the rear of the galvanometer assembly where this conductor is secured to a terminal lug 47. The upper bracket 37 is connected to an electrical conductor 48 which also passes through the cable 46 to the rear of the galvanometer assembly where the conductor 48 is connected to a terminal or lug 49. The pole extension piece 23 is provided with a transverse slot 51 in which is mounted by a suitable cement a galvanometer lens 52 whereby light may be directed upon the mirror 35 and redirected toward a suitable recording device.

The plate 24 carries pole tips 23 and 27, a lens 52, a plate 43 secured in position by screw members 44 carrying a spring 42 secured to the lower wire 34 of the galvanometer element.

The galvanometer coil 32 and the wires 33 and 34 are carried between the spring 42 and a set screw 36 mounted in a bracket or support 37 which is mounted upon an insulated plate 38 and secured in position by screw members 39. The electrical wire conductors 45 and 48 also form a part of the unitary assembly which may be removed by loosening the screws 21 and removing the pole piece 19 after the spring 53 has been disengaged and the outer terminals of the electric wire conductors have been disengaged. These various assemblies are individually removable and interchangeable so that any one of the galvanometer elements may be serviced. This galvanometer element is pivotally supported by the pole piece extension portions 23 and 27 engaging the arcuate surfaces 22 and 26 of the front and rear pole piece members 19 and 25. The assembly is retained in an adjusted position by a spring 53 engaging a stud 54 mounted adjacent the top of the bracket 37. The spring 53 also engages one extremity of a terminal screw 55 which passes through a terminal plate 56 of conductive material and an insulating plate 57. The insulating plate 57 is supported from a metal plate 58 which is secured to a portion of the back pole extension piece 25 by suitable fastening means not shown such as screws or bolts.

The plate 56 is provided with a suitable aperture in which is mounted a member 59 having a knurled portion 61 for frictional engagement with the opening in the plate 56 and in the insulating plate 57. The member 59 extends inwardly to a bifurcated portion 62 having sufficient inherent resiliency so as to tend to close together thereby to engage and retain in position the threaded end portion 63 of an adjusting screw 64. The adjusting screw 64 may be moved horizontally so that the end thereof 63 may determine the angular position of the plate 24 relative to the remainder of the apparatus.

The adjusting screw 64 causes the plate 24 to pivot about an axis extending centrally and horizontally through the pole pieces 19 and 25 by virtue of the curved surfaces 22 and 26. The convex surfaces of the pole tips 23 and 27 act in the manner of a shaft in suitable bearings to permit the angular positioning of the member 24 so that light reflected by the galvanometer mirror 35 is directed at the proper angle upon the recording material. The end of the threaded portion 63 of the screw 64 engages an extension bracket portion 65 forming a part of the bracket 37 secured to the plate 24. Thus the adjustment of the screw 64 determines the elevation of the light reflected from the mirror 35. In order to control the horizontal position of the image of a beam of light reflected from the mirror 35, the adjusting screw 36 may be moved to provide the desired correction.

The plate 56 is secured to a binding post 66 for connection to the external circuit which is to energize the movable element of the galvanometer assembly. Immediately below the plate 56 there is provided another metal plate 67 having mounted thereon a binding post 68 preferably secured in position by soldering. The plate 67 is retained in position on the insulating member 57 by an extension 69 of the binding post 68 which extends through suitable apertures in the plate 67 and in the insulating member 57. The plate 67 furthermore is retained in position by a screw 71 which engages the conductor terminal lug 47. The insulating plate 57 is provided with a threaded aperture for receiving the threaded portion of the screw 71. The binding post 68 therefore may be connected to the other terminal of the external circuit, one terminal of which has been connected to the binding post 66.

From the various figures it will be seen that there has been provided a cover 72 having a front opening 73 so that light may pass through the lens 52 and onto the mirror 53 of the galvanometer assembly. The cover 72 extends upwardly from the front end over the top toward the rear so that the various cables 46 may extend to the rear so that the conductors therein may be connected to the lugs 47 and 49. The cover may be secured in position by a plurality of screws 75 which may engage the end edges of the upright metal plate 58. A single upright plate 58 is secured to the rear pole piece 25 which preferably is but a single piece whereas the front pole piece extensions comprise a plurality of individual members 19, one for each of the galvanometer assembly. It will be noted that the opening in the front pole piece 19 through which the fastening screw 21 extends may have sufficient clearance so as to provide for slight adjustment of the front pole piece 19 thereby to insure the proper degree of freedom for facilitating the movement of the galvanometer assembly by virtue of the bearing-like contact of the pole piece extensions 23 and 27 with the concave surfaces 26 and 22 of the rear and front pole pieces.

While for the purposes of illustrating and describing the present invention, a certain embodiment has been shown, it is to be understood that the invention is not to be limited thereby since such variations may be made in the arrangement and in the instrumentalities employed as are commensurate with the scope of the invention as defined in the following claim.

The present invention is hereby claimed as follows:

An oscillograph galvanometer comprising a magnetic field structure having a pair of pole piece extensions each provided with opposed concave surfaces corresponding to a section of a cylindrical surface, at least one of said pole piece extensions being adjustable relative to each other, a galvanometer element support comprising a vertical sheet of non-magnetic material, a galvanometer element mounted on one face of said sheet, a pair of paramagnetic pole tips mounted on said face of said sheet on opposite sides of said element, each pole tip having a convex surface complementary to the concave surface of said pole piece extensions whereby said tips serve as pivotal bearings supported by said pole piece extensions and said support may be shifted without changing the flux path of said structure, each tip adjacent said element being so shaped as to concentrate the flux of the magnetic field structure at said element, a mirror mounted on said element above said pole tips, a lens carried by one of said tips to concentrate light on said mirror, and means accessible from the exterior of said galvanometer for adjustably securing in position said galvanometer element and support.

CLAUDE M. HATHAWAY.

REFERENCES CITED

The following references are of record in the file of this patent:

UNITED STATES PATENTS

| Number | Name | Date |
|---|---|---|
| 1,981,266 | Green | Nov. 20, 1934 |
| 2,060,963 | Degrift | Nov. 17, 1936 |
| 2,149,442 | Kannenstein | Mar. 7, 1939 |
| 2,268,526 | Palmer | Dec. 30, 1941 |
| 2,389,081 | Redmond | Nov. 13, 1945 |

FOREIGN PATENTS

| Number | Country | Date |
|---|---|---|
| 40,275 | France | Feb. 12, 1932 |